May 23, 1972   H. BROCKMANN   3,664,649
FURNACE HAVING STRUCTURE FOR FEEDING WORK
THROUGH A HEAT TUNNEL
Filed Jan. 26, 1970   13 Sheets-Sheet 2

INVENTOR:
Heinz BROCKMANN
BY: Arthur O. Klein
Attorney

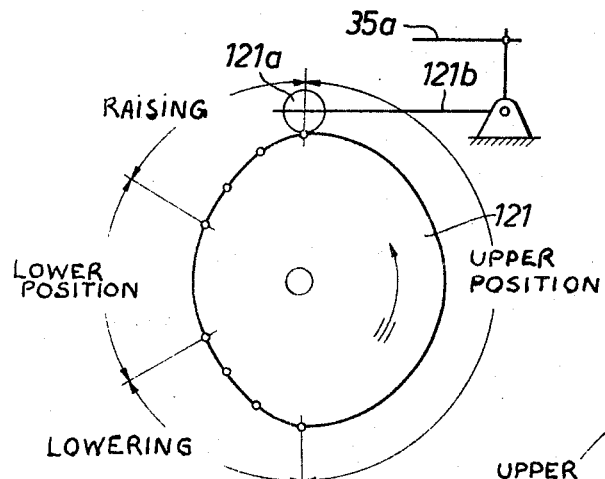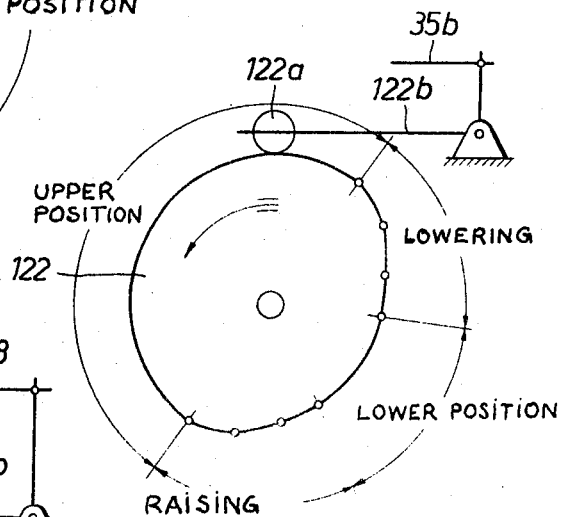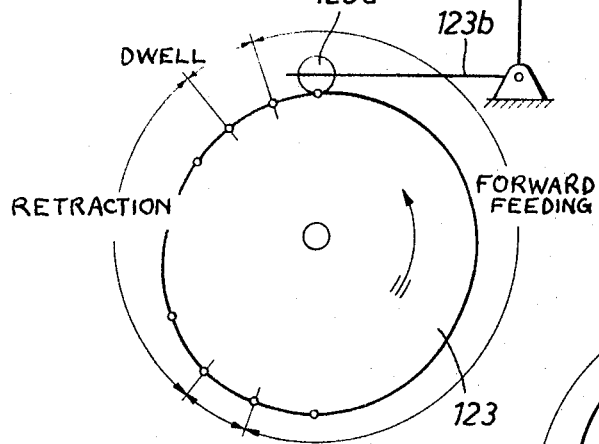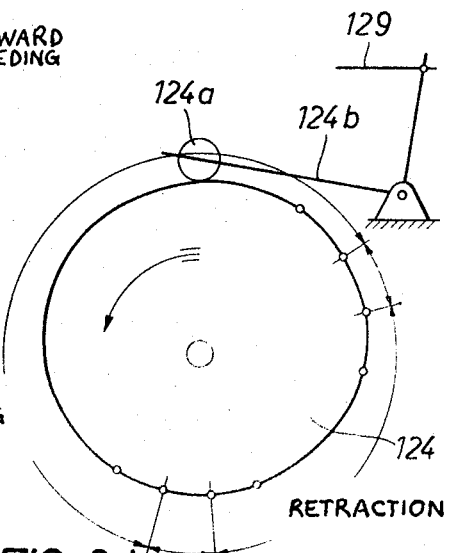

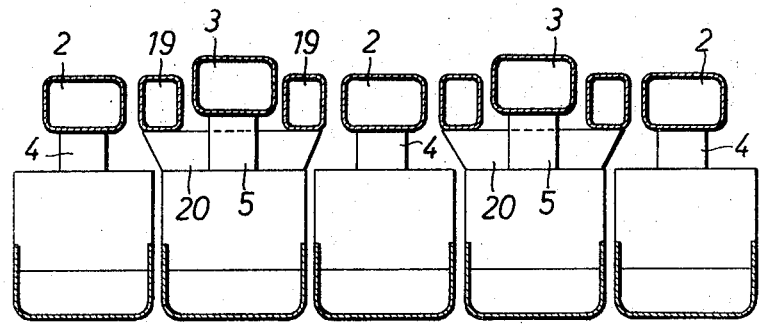
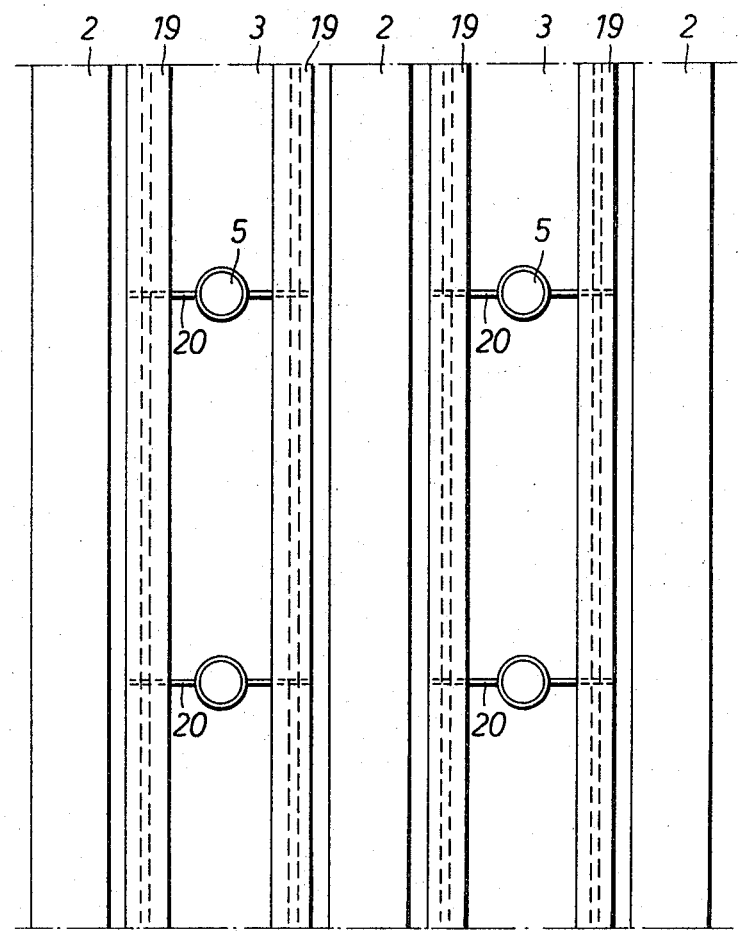

INVENTOR:
BY: Heinz BROCKMANN
Arthur O. Klein
Attorney

INVENTOR:
BY: Heinz BROCKMANN
Arthur O. Klein
Attorney

INVENTOR:
BY: Heinz BROCKMANN
Arthur O. Klein
Attorney

United States Patent Office 3,664,649
Patented May 23, 1972

3,664,649
FURNACE HAVING STRUCTURE FOR FEEDING WORK THROUGH A HEAT TUNNEL
Heinz Brockmann, Dusseldorf-Gallberg, Germany, assignor to Brockmann & Bundt Industrie-Ofenbau, Dusseldorf, Germany
Filed Jan. 26, 1970, Ser. No. 5,742
Claims priority, application Germany, Apr. 16, 1969, P 19 19 156.1
Int. Cl. F27b 9/14
U.S. Cl. 263—6 A
10 Claims

ABSTRACT OF THE DISCLOSURE

A furnace having an elongated heat tunnel through which the work passes to be heated therein. A pair of sets of beams extend longitudinally of the heat tunnel and form a floor thereof for supporting work, and at least one of the sets of beams is cyclically movable with respect to the other in such way that this one movable set of beams moves upwardly and forwardly with respect to and downwardly and rearwardly with respect to the other set of beams to provide in this way a stepwise advance of the work through the tunnel. The beams have laterally offset work-engaging surfaces to provide a more uniform heat distribution at the lower surface of the work. Also, the structure which controls the movement of the beams provides for the latter a smooth, gradual movement when the work is raised up from and again set down on the upper surfaces of the beams.

BACKGROUND OF THE INVENTION

The present invention relates to structures for feeding work through a heat tunnel wherein at least two sets of beams are operatively mounted to move the work in a feed direction through the heat tunnel. In the conventional furnaces of this type, the work is moved in a stepwise manner by the beams which causes the work to be heated in a non-uniform manner. The work therefore acquires during the movement through the heat oven dark stripes at its underside. These dark stripes define the regions of different temperatures on the underside of the workpiece. If the workpiece consists of a high alloy metal, these temperature differentials are particularly disadvantageous during the hot-working that follows this heat-treatment of the workpiece. Different attempts have been made to also heat the underside of the workpiece by means of a so-called underheating installation, by means of which heat is conducted from below and between the beams onto the workpiece in order to uniformly heat it. Although such an installation does bring about a more uniform heating of the workpiece, it has the significant drawback that the beams are subjected to a higher heat load.

SUMMARY OF THE INVENTION

It is accordingly a primary object of the present invention to provide a heat tunnel construction of the afore-described type, in which also the underside of the workpiece is uniformly heated without simultaneously having a disadvantageous effect on the transporting beams.

According to the invention, this object is attained by having the transporting beams contact the workpiece with different contacting surface and by shielding the slits between the adjacent transporting beams against heat losses of the workpiece due to heat radiation.

The construction of the heat tunnel of this invention takes into consideration that, for practical purposes, it is impossible to avoid different heat losses on the underside of the workpiece. However, all of the regions of the underside of the workpiece are non-uniformly heated in the same manner, that is, all regions of the underside of the workpiece have the same irregular heat losses, so that on the average, the underside of the workpiece is heated in substantially uniform manner.

It has been found that a sufficiently uniform heating of the underside of the workpiece can be effected by providing a relatively minor exchange of contacting areas between the workpiece and the transporting beams. This required change of contacting surfaces can be further reduced by providing insulating means disposed along the slits between the transporting beams for reducing the heat losses of the workpiece due to heat radiation.

A further feature of this invention resides in providing the transporting beams with U-shaped cross-sections. These U-shaped cross-sections face the workpiece. The transporting beams furthermore have cutouts in the longitudinal direction so that the two sets of transporting beams are positioned in a nested relationship with respect to each other thereby reducing the distance between adjacent transporting beams. The workpiece thus rests on narrow supporting surfaces which extend in sinusoidal fashion along the feed direction of the workpiece, so that the workpiece is constantly coming into contact with the transporting beams at a different contact surface on its underside.

The transporting beams preferably change in cross-section independently from each other, that is, the cross-section is increasing or decreasing. Such an arrangement would ordinarily cause a relatively wide slit between adjacent transporting beams which would increase the heat losses due to heat radiation. In order to avoid this, the transporting beams are provided along their longitudinal sides with rectangular cutouts disposed equidistantly so that the adjacent beams may be positioned in a nested relationship with respect to each other. The rectangular cutouts are dimensioned so that no interference is caused between adjacent transporting beams due to the movement of each transporting beam in the feed direction.

Furthermore, the transporting beams are provided with longitudinal members disposed directly over or under the slits between the transporting beams. These longitudinal members serve to insulate the workpiece against heat losses due to heat radiation. The longitudinal member may be semicircular in cross-section. If these longitudinal members are arranged underneath the slits, they serve the function of radiation shields and reflect the heat radiation back onto the workpiece.

If these longitudinal members are advantageously heated, the reflected radiation is increased so that the workpiece receives the desired temperature more rapidly.

Thus, a practically impact-free raising of the work from the stationary beams during upward movement of the beams can be achieved with such cam configurations. The same results are achieved by using similar camming configurations in the control cams which regulate the flow of the fluid, such as oil, to bring about the desired controls.

In those cases where it is not possible to use hydraulic structures of the above type because of the fact that dirt and/or other undesirable matter will have access to the structure, it is possible to use instead spring elements which eliminate the shocks and impacts and thus protect not only the work but also the furnace structure and work handling structure. The springs can act directly on the beams or may be situated in the transmissions which bring about the beam movement.

With such an arrangement according to whether the work is heavy or light it is possible to interchange one set of springs with one characteristic for another with another characteristic so that the structure can be adapted to the particular characteristics of the work which is to be treated. Thus, when the structure is idle with the springs unstressed, it is possible to bring about a rapid, convenient interchange of one type of spring for another.

BRIEF DESCRIPTION OF THE DRAWINGS

The invention is illustrated by way of example in the accompanying drawings which form part of this application and in which:

FIGS. 3a–3d show schematically four rotary cams which are rotatable about a common axis and which bring about the elevational and longitudinal movement of the sets of feed beams;

FIG. 6 is a schematic transverse sectional elevation of an arrangement where a radiation shielding structure is situated in the gaps between the beams;

FIG. 7 is a fragmentary schematic plan view of the arrangement of FIG. 6;

DESCRIPTION OF PREFERRED EMBODIMENTS

Figure 1:
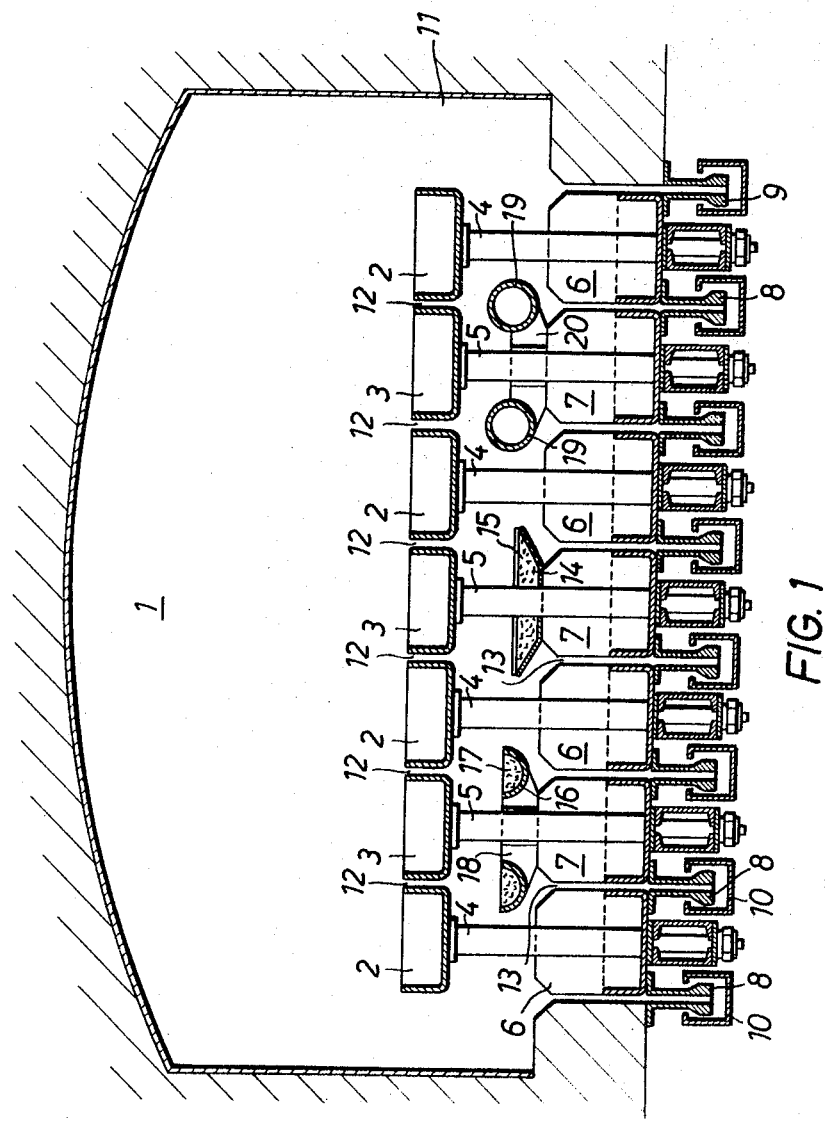
FIG. 1 is a schematic transverse sectional view of a heat tunnel of a furnace provided with two sets of feed beams where the beams of both sets are movable and are alternately arranged across the furnace with the beams extending longitudinally thereof.
Figure 2:
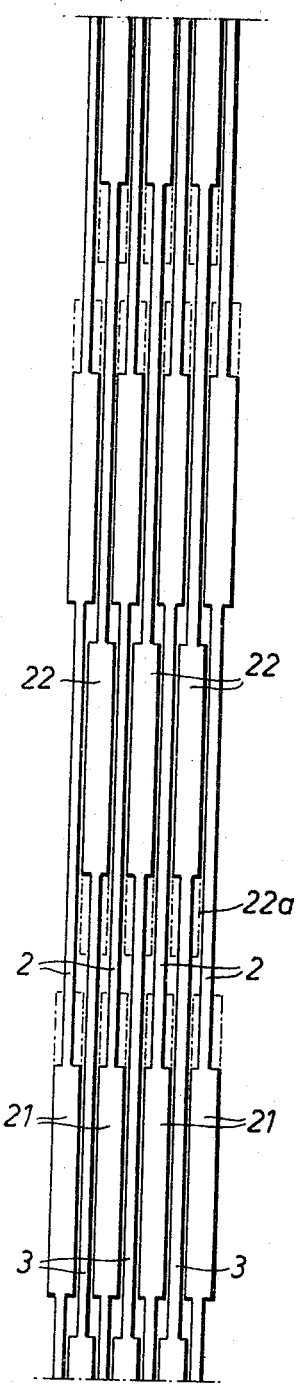
FIG. 2 is a fragmentary schematic plan view showing the arrangement of the upper surfaces of the beams.
Figure 3:
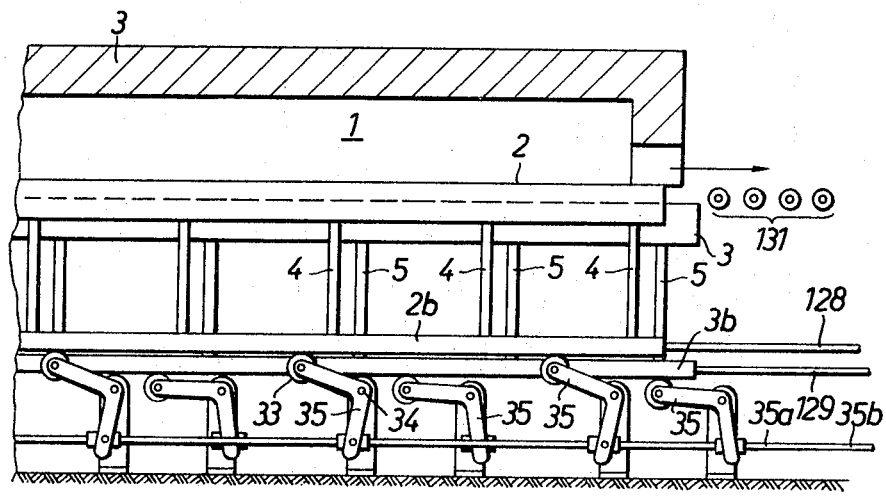
FIG. 3 is a fragmentary longitudinal partly sectional elevation showing the drives for the beams.

With the structure illustrated in FIGS. 1–3, the interior chamber 1 of the heat tunnel illustrated in FIG. 1 accommodates in a predetermined plane a plurality of parallel longitudinal extending feed beams 2 of one set and a plurality of parallel longitudinal extending feed beams 3 of a second set, with the beams of the different sets alternating with each other as illustrated. Thus the beams 2 form one set of feed beams and the beams 3 form a second set of feed beams. The work is engaged by the upper surfaces of these beams. Thus, supporting columns 4 or the like are fixed to and extend downwardly from the beams 2 in order to support the latter, while similar columns 5 are fixed to and extend downwardly from the beams 3 to support the latter beams. These supporting columns 4 and 5 can be fixed with unillustrated separate lifting or carrying frames. The columns 4 and 5 extend through floor elements 6, 7 made of fire-resistant material, and these elements 6 and 7 move up and down as well as longitudinally with the columns 4 and 5 which move together with the beams 2 and 3, respectively. From each of the floor elements 6 and 7, there extends a pair of webs or aprons 8 or 9. The pair of aprons 8 or 9 of each of the floor elements 6 and 7 extend downwardly into seals formed by elongated containers 10 in the form of channels having upper open ends through which the webs extend into a liquid such as water situated in the channels to form a seal in this way. In this way, the hot gas which flows through lower oven region 11 is sealed while the feed beams carry out their movement.

Between the beams 2 and 3 there are longitudinal gaps 12, and vertically beneath and alinged with the gaps 12 are the longitudinal gaps 13 which are defined between the floor elements 6 and 7. Since the side walls defining the floor gaps 13 become continuously darker toward the region of the water seals 10, so that they become continuously colder, and are practically black at the region of half their height, at the floor gaps 13 a considerable amount of the radiation will be absorbed so that the work will have black stripes formed thereon at the lower surface of the work at what corresponds to the gaps 12 with the conventional furnaces.

Figure 2A:
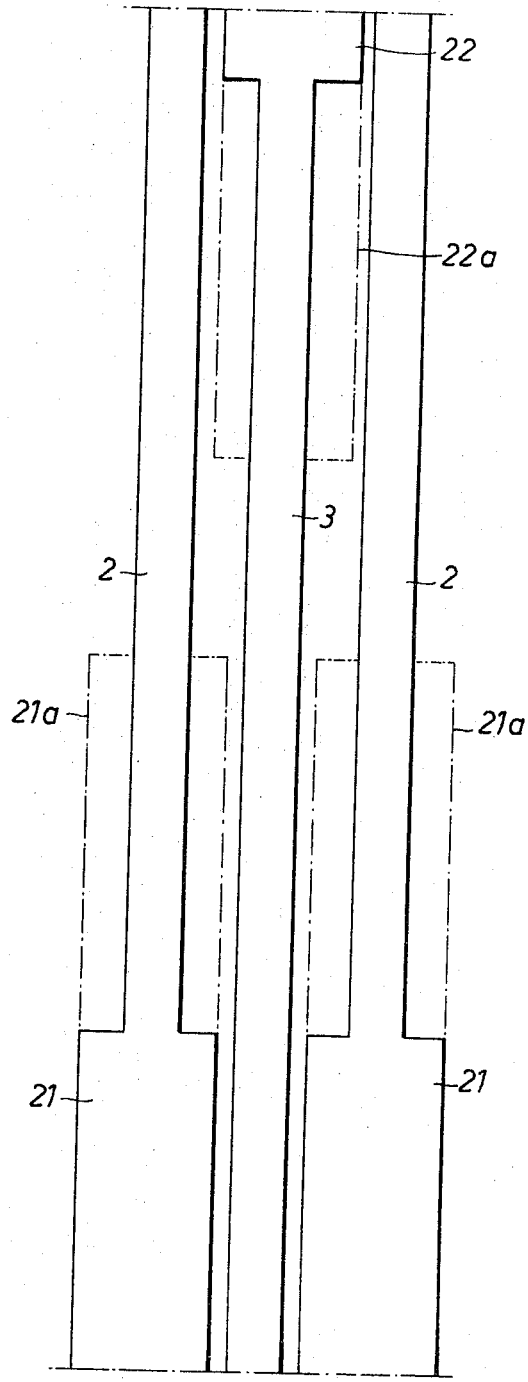
FIG. 2a is an enlarged schematic illustration of the arrangement of FIG. 2.

In order to avoid this undesirable result, the beams 2 and 3 have the laterally offset construction shown most clearly in FIGS. 2 and 2a. Thus, the upper surfaces 21 and 22 for the work is divided in several sequential rows transversely with respect to the feeding movement into gaps or spaces which are offset laterally with respect to each other. In this way, the work entering the successive longitudinal feeding movements will engage changing supporting areas distributed laterally while the work moves forwardly. Thus, a more even distribution of the heat over the bottom surface of the work is achieved.

In order to avoid any interference in the movement of the beams as a result of the laterally offset surfaces 21 and 22 thereof, the average distance between the laterally offset portions of the beams is maintained greater than the length of a feeding stroke. This arrangement may easily be seen in FIGS. 2 and 2a, where on the one hand surfaces 21 of the beams 2 of one set of feed beams is illustrated in solid lines at its rear end position while the supporting surfaces 22 of the other set of beams 3 is shown in solid lines in its forward end position at the end of a feeding stroke. The points in the operating cycles where the laterally offset beam parts are closest to each other are illustrated where the surface areas occupy the dot-dash line areas 21a and 22a. By taking the average between the largest and smallest distance between the opposed offset parts of the beams, and making this average value greater than the length of the feed stroke any possible interference is avoided.

As has been pointed out above, each set of beams is operated through a cycle where each beam thereof carries out a substantial rectangular path of movement. Care is taken in the synchronization of the movements of the sets of beams to see to it that the straight-line feeding steps of the beams of both systems are overlapped in their time of operations in such a way that the lowering, rearward movement, and raising of one set of beams requires, at a maximum, the amount of time which the straight-line forward movement of the other set of beams requires. In this way the heated work is maintained at a constant elevation and is moved through the furnace at a constant speed.

One possible example for the control of the movement of the beam sets I, II is illustrated in FIG. 3 and in detail in FIG. 3a–3d. The beams 2 which extend longitudinally through the tunnel 1 and which form the set I are alternately arranged with the identical beams 3 forming set II. The beams of the different sets operate with a certain phase shift therebetween but otherwise they uniformly remain parallel to each other in vertical planes.

It can be seen that the work-supporting beams 2 and 3 are supported themselves by the columns 4 and 5 on the longitudinal extending supporting beams 2b and 3b, respectively. These supporting beams are themselves longitudinally movable on rollers 33 so as to be movable in the longitudinal direction of the heat tunnel. These rollers 33 are turnably carried by the free ends of arms of bell cranks 35 which are suported for movement about the stationary horizontal axes defined by the pivots 34. The downwardly directed arms of the bell cranks 35 are interconnected by a common push-pull rod 35a (for set I) while the push-pull rod 35b interconnects the downwardly directed arms of the bell cranks of the beams of set II. Through these bell cranks 35 the sets I and II are independently moved up and down in a manner which is also independent of the forward and rearward movement of the feed beams. This forward and rearward movement of beams 2 and 3 is brought about by way of independently driven push-pull rods 128 for set I and 129 for set II, these rods 128 and 129 being respectively connected with the support beams 2b and 3b.

In order to feed the work in a desired manner according to which it will constantly remain at a given elevation and will move at a uniform speed longitudinal through the furnace, all of the upper surface area of the beams move at all points thereof in a primarily rectangular path, with the movement of the different sets of beams synchronized with respect of each other in such a way that one set is raised up to the feed plane of the work before the other set is lowered down from this plane. This is required so that the feed beams will always provide a constant forward feeding speed and at the same time are capable of being lowered and returned to their starting positions at a higher speed.

The desired movement of the beams of the different sets and of the rods 128 and 129 as well as bell cranks 35 and push-pull rods 35a, 35b connected thereto can be brought about, for example, by way of the four cam arrangements 121, 122, 123, 124 respectively illustrated in FIGS. 3a–3d. The cams shown in these figures are turnable about a common axis and they are mounted on a common cam shaft and rotate at the same speed. The circumferences of the non-round cams are provided with substantially circular camming peripheral portions for the upward movement and feeding movement and with relatively flattened sections for the accelerated downward and rearward movement until a new feeding stroke is achieved, these movements being transmitted through the follower roller 121a, 122a, 123a, 124a. Thus, through the cam follower rollers the configuration of the cam is transmitted to the bell crank levers 121b, 122b, 123b, 124b which in turn actuate the push-pull rods 35a, 35b, 128, 129, in the manner schematically illustrated in the drawings.

It is also possible to achieve substantially the same movements for the feed beams hydraulically or electrically.

FIG. 3 shows at the discharge end of the furnace a series of work-supporting rollers 131, along which the work travels out of and beyond the furnace while a similar set of rollers are provided at the entrance region of the furnace to feed the work thereto. The plane or elevation at which these rollers maintain the work as it is fed into and discharged from the furnace is the same as the feed plane which is provided for the work by the sets of beams described above. The feed and discharge rollers can be driven at a speed which will maintain the work travelling at the same speed as that at which it is moved through the heat tunnel.

In order to reduce the disadvantageous effects provided at the floor gaps 13, the lower region 11 of the furnace is provided according to the invention with radiation shields. Thus, FIG. 1 shows one type of radiation shield structure 15 of trapezoidal configuration filled with an insulating mass 14, and longitudinal edges of the shield 15 extend up to the region of the adjoining columns 4, so that the shield structure is situated beneath the gaps 12. The several shields 15 may be carried by the floor elements 7 and move together with the set of beams 3. However, it is also possible to provide a radiation shield by way of the elongated channel 16 of semicircular configuration which are also filled with a heat-blocking insulating material 17 and which may be connected by brackets 18 to the columns 5. The axis of the semicircular channels 16 are situated centrally with respect to the floor gaps 13.

According to yet another embodiment, the radiation shield may take the form of pipes 19 which are carried by brackets 20 which are fastened to the columns 5 and which, in the same manner as the semicircular channels 16, are aligned with the floor elements 7 situated therebeneath and the beams 3 situated thereover.

The interior of the pipes can be heated. Several different embodiments 15, 16, 19 of the heat shields of the invention can be used either separately or in combination as illustrated in FIG. 1, and they cover the floor gaps to such an extent that the extremely high absorption capability at these floor gaps no longer has any disadvantageous effect at the free surface areas of the work accessible through the gaps 12, so that these areas can now be uniformly heated.

Figure 4:
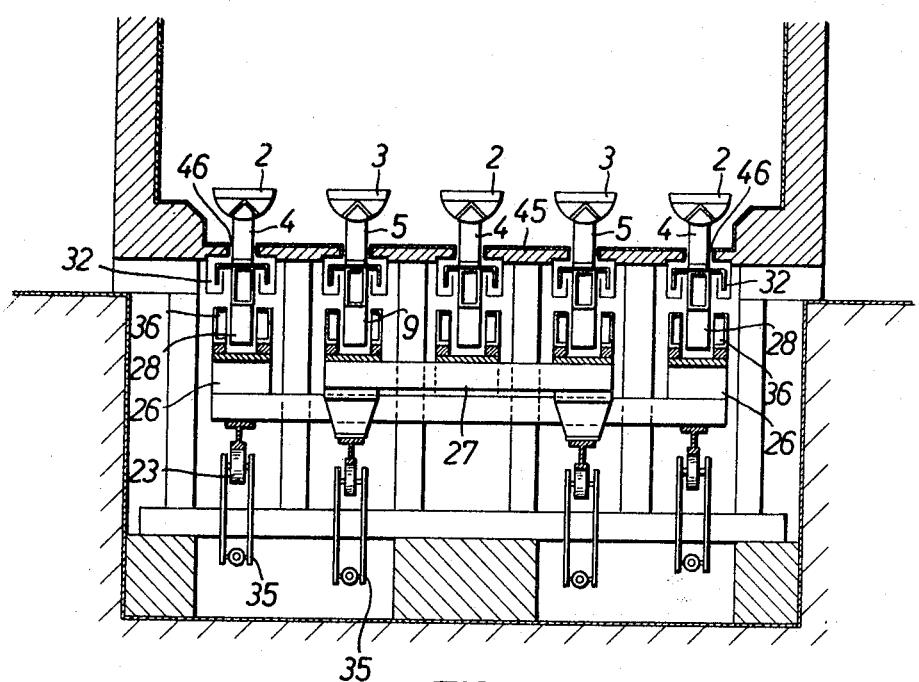
FIG. 4 is a transverse fragmentary schematic sectional elevation of a heat tunnel also having two sets of feed beams which are supported through an intermediate frame on the drives which raise and lower as well as move the beams forwardly and rearwardly.
Figure 5:
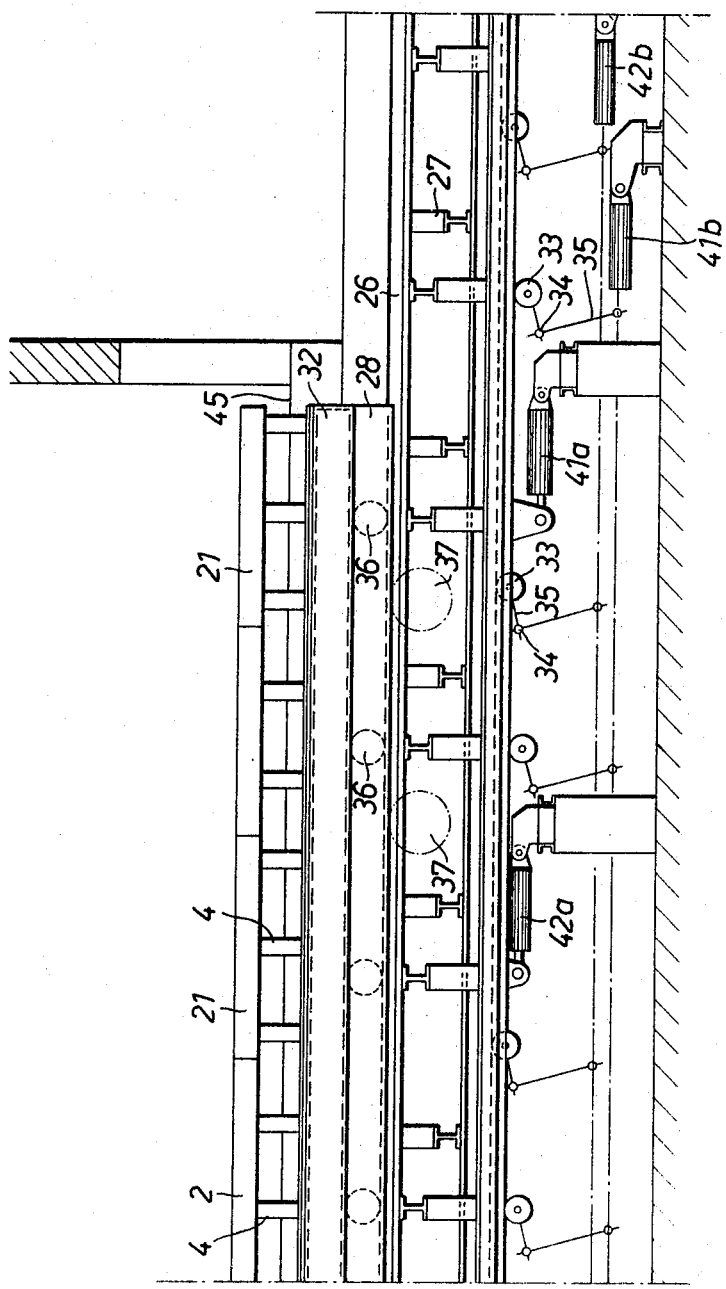
FIG. 5 is a schematic fragmentary partly sectional side elevation of the arrangement of FIG. 4.

With the embodiment of the invention which is illustrated in FIGS. 4 and 5, the sets of beams 2 and 3 are movable in the same way. The beams 2 and 3 are respectively carried by their columns 4 and 5 but not in the usual way directly on the frames 26 and 27 which are raised and lowered and moved forward and rearwardly but instead upon an intermediate frame 28, 29 which is longitudinally movable with respect to the frames 26 and 27 by way of a special drive.

The drive for the supporting frames 26 and 27 can take the form illustrated and described above in connection with FIGS. 3 and 3a–3d. As is particularly apparent from FIG. 5, the longitudinal carrier beams of the carrier frames 26 and 27 are supported by way of rollers 33 on the longitudinally extending arms of the bell cranks 35 which are supported for swinging movement on the horizontal, transversely extending pivots 34, the downwardly extending arms of these bell cranks bringing about upward and downward movement of the rollers 33 by way of the hydraulic pressure devices 41b and 42b which act to move the bottom ends of the bell cranks 35 forwardly and rearwardly. The longitudinal movement of the frames 26 and 27 is brought about by way of hydraulic devices 41a and 42a which are operatively connected to the carrier beams to shift them longitudinally. The supporting frames 26 and 27 extend outwardly through and beyond at least one end of the furnace while the intermediate frames 28 and 29 rest by way of rollers 36 on top of the carrier beams 26, 27. The drive for the intermediate frame components 28, 29 can, for example, take place via rotary pinions 37 which mesh with rack teeth situated at the underside of the intermediate frame components 28, 29. The supporting arms 4 and 5 extend through the hearth floor 45, passing through longitudinally extending slots 46 which are formed in the furnace floor. The slots 46 are sealed via the longitudinally extending sealing liquid container channels 32 which receive downwardly extending sealing webs carried by the columns 4 and 5 with this sealing structure extending longitudinally throughout the entire length of the furnace.

With the arrangement shown in FIGS. 6 and 7, only in a schematic manner, the structure which may otherwise be the same as that of FIGS. 2 and 2a is provided between the feed beams 2 and 3 in the gaps therebetween with radiation shielding pipes 19 which provide upper covering structures and preferably have at their upper end regions the rectangular cross-sectional configuration illustrated in FIG. 6. The shielding pipes 19 are arranged in pairs on brackets 20 carried by the supporting columns 5 of the set of beams 3.

Referring now to FIGS. 8–11, the embodiment of the invention which is illustrated therein also includes two sets of beams which alternate with each other in the manner described above, although only part of one beam 2 is illustrated. Each beam is provided at its uderside with raising cams 57 of wedge-shaped configuration and slide plates 58, the components 57 and 58 being fixed to each of the beams. Beneath each beam there is a hydraulic cylinder 59 of the invention, fixedly supported in any suitable way and accommodating in its interior a pair of double-acting pistons 61 and 62. The piston rods 63 and 64 of the pistons 1 and 2, respectively, directly engage on the one hand the beam 2 and on the other hand the cam 57. Thus, it will be seen that the piston rod 63 extends in a fluid-tight manner outwardly beyond the cylinder 59 to be connected to a roller 65 which is received in the rectangular opening formed in the slide block 58 so that through this block the beam can move up and down with respect to the rod 63 while being compelled to move longitudinally therewith. On the other hand, the rod 64 terminates outwardly beyond the cylinder in a roller 66 which directly engages the downwardly directing camming surface of the cam 57. The piston rod in this case has an extension forming a transversely extending locking member 67 situated between a pair of stop projections 68 and 69 of the lifting wedge 57.

The hydraulic cylinder 59 has in its interior a transversely extending wall 71 forming an inner stop member and dividing the interior of the cylinder 59 into a pair of chambers 72 and 73. These chambers communicate with each other through the common inlet 74 situated at the transverse wall 71. Pressure fluid conduits 75, 76 and 77 communicate with the interior of the cylinder 59 in the manner shown schematically in FIG. 8. Thus the conduit 76 is situated in the region of the passage 74 through the wall 71 providing communication between the chambers 72 and 73 so that in this way the intermediate conduit 76 communicates with both of the chambers 72 and 73. In order to provide an impact-free lifting of the work situated on the feed beams during upward movement of the beams, the camming surface 60 of the wedge 57 has a sinusoidal configuration. The result is that the lifting speed is controlled in a corresponding sinusoidal manner so that even though there is a constant speed of movement for the piston 62 nevertheless the work moves during upward movement from zero speed to be accelerated when raised from a stationary beam. This is brought about by providing the camming surface 60 of the wedge 57 with a horizontal portion which will bring about zero lifting movement at the instant when the horizontal portion of the camming edge engages the roller 66.

Figure 8:
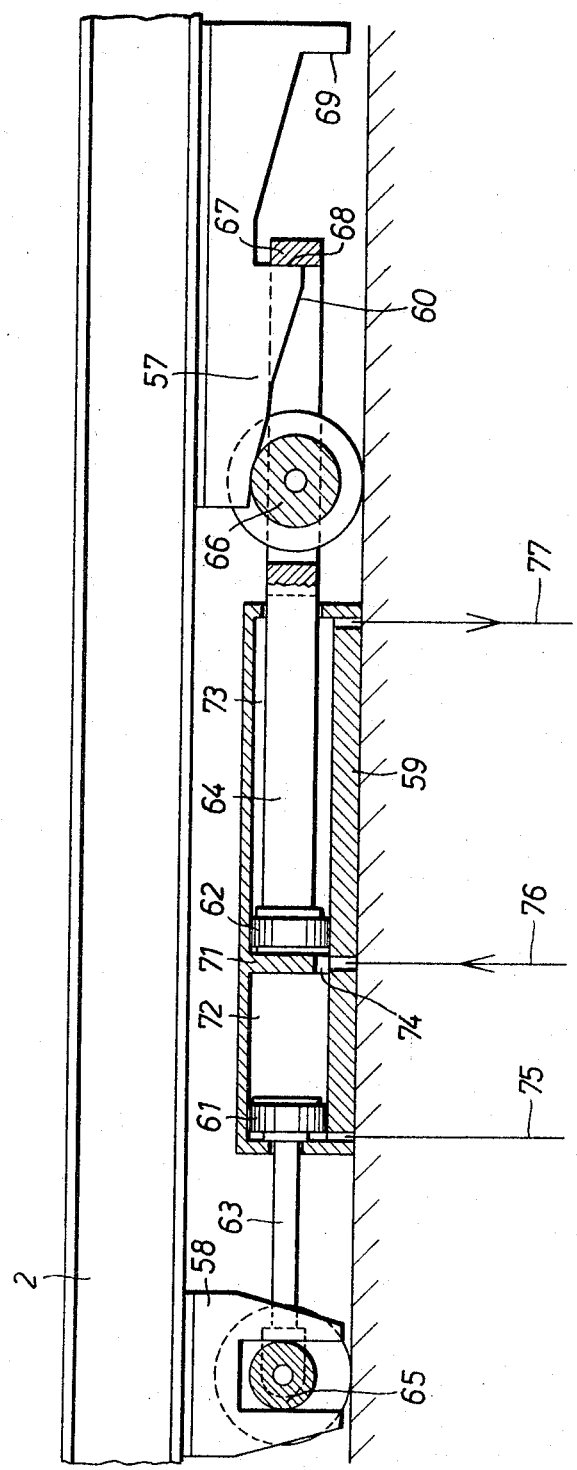
FIG. 8 is fragmentary schematic partly sectional longitudinal elevation of a hydraulic operating means shown in its rest position.
Figure 9:
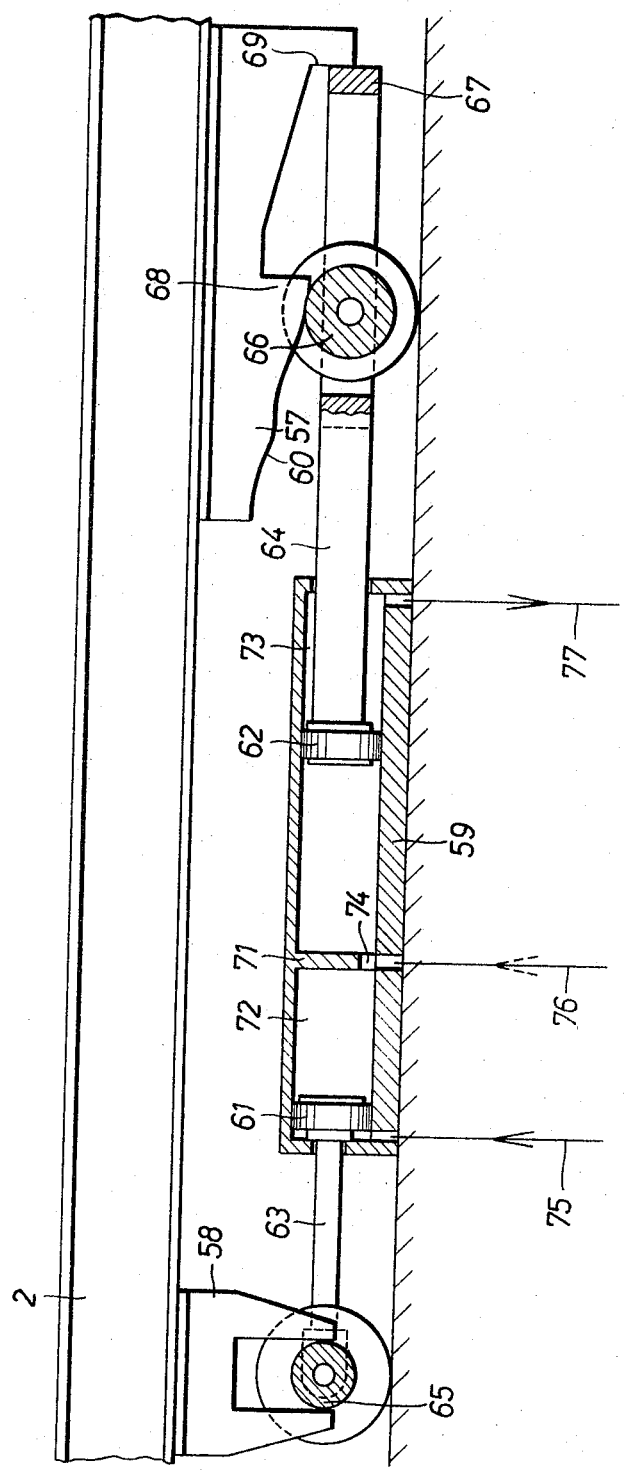
FIG. 9 shows the structure of FIG. 8 after the parts have reached the end of the lifting stroke.

In the starting position shown in FIG. 8, the piston 61 engages the left end of the cylinder 59 so as to be situated at the left end of the cylinder chamber 72, while the piston 62 is at its left end position engaging the wall 71. The lock 67 engages the stop 68. The operating cycle begins with the lifting of the beam 2, so that initially the oil is introduced through the conduit 76 and the intermediate passage 74 into both of the chambers 72 and 73. As a result, the piston 62 moves to the right, while the piston 61 remains in the position illustrated in FIG. 8, and thus the roller 66 advances to the right along the camming edge of the cam 57 to bring about a lifting movement of the beam 2. Of course, the slide plate 58 will move upwardly with respect to the roller 65 but the latter will remain stationary. During the upward movement of the beam 2, the piston 61 dwells at the initial position illustrated in FIG. 8 since the fluid under pressure acts in this chamber 72 to maintain the piston 61 at the illustrated position. The lifting stroke brought about via the piston 62 is limited by engagement of the lock 67 with the other stop 69, and the parts are shown in this position in FIG. 9. Since both of the cylinder chambers 72 and 73 at this time are under the pressure of the fluid in the conduit 76, the pair of pistons 61 and 62 form through their piston rods and through the lock member 67 and stop 69 the equivalent of an integral one-piece structure the components of which are not movable relative to each other.

It is in this condition of the components that the longitudinal feeding movement is brought about. Thus, while maintaining the pressure within the conduit 76 and between the pistons 61 and 62, oil under pressure is introduced through the conduit 75 into the chamber 72. As a result of the inter connection between the components providing the effect of a one-piece structure as described above, the entire system moves as a unit to the right, bringing about a feeding stroke which terminates when the piston 61 engages the transverse stop wall 71. At this time the piston 62 will be situated at the right end of the cylinder chamber 73. Thus, at the end of the feeding stroke, the components will have the position indicated in FIG. 10.

The lowering of the beam 2 is initially blocked by the fluid under pressure within the conduit 75. Through the conduit 77 oil under pressure is introduced into the chamber 73 at the right of the piston 62, and at the same time the oil which is in the chamber 73 to the left of the piston 62 can flow out through the conduit 76. Thus, the piston 61 remains in the position illustrated in FIG. 10 engaging the intermediate stop wall 71 while the piston 62 moves to the left toward the stop wall 71, with the result that the beam 2 moves down. This movement continues until the lock member 67 engages the stop 68, so that the parts will now have the position shown in FIG. 11. Then for the return of the beam 2 the conduit 76 is blocked and the conduit 75 is opened while through the conduit 77 further oil under pressure is introduced into the chamber 73. In this way both of the pistons 61 and 62 are simultaneously moved to the left until the piston 61 again engages the left end of the cylinder 59 and the piston 62 again engages the intermediate wall 71, so that the parts have resumed their starting position shown in FIG. 8.

Figure 10:
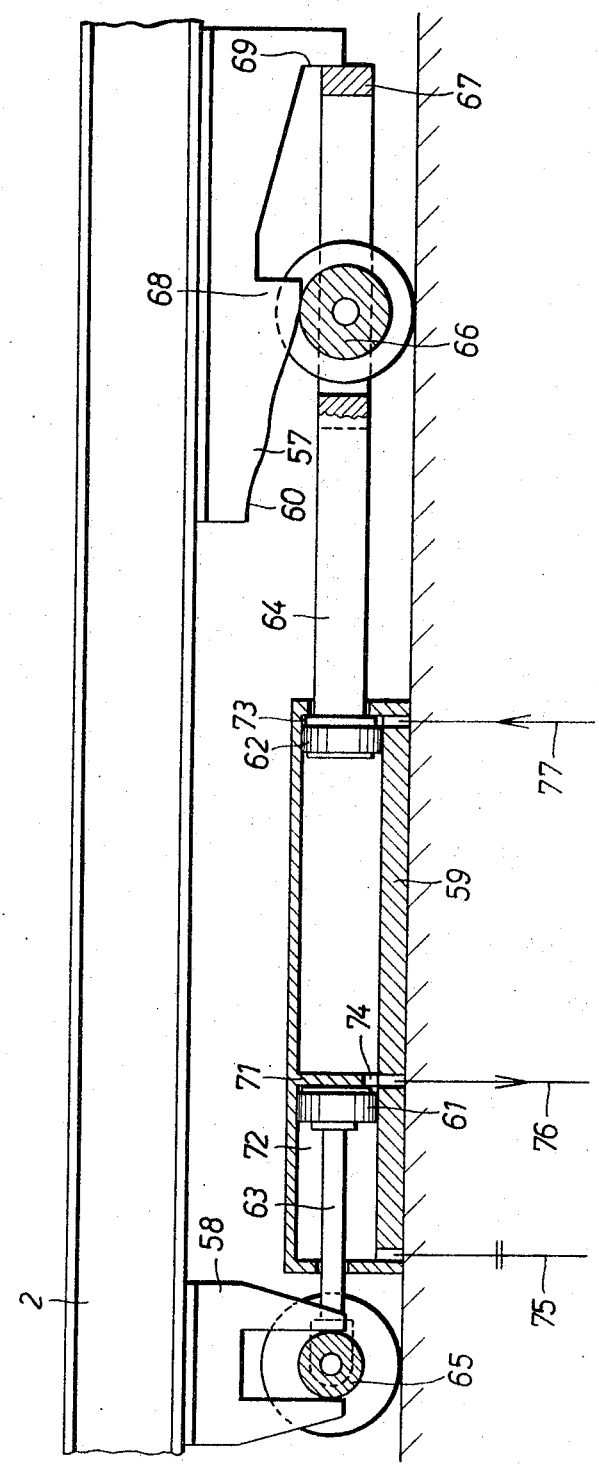
FIG. 10 shows the position which the parts of FIGS. 8 and 9 take at the end of a longitudinal feeding stroke.
Figure 11:
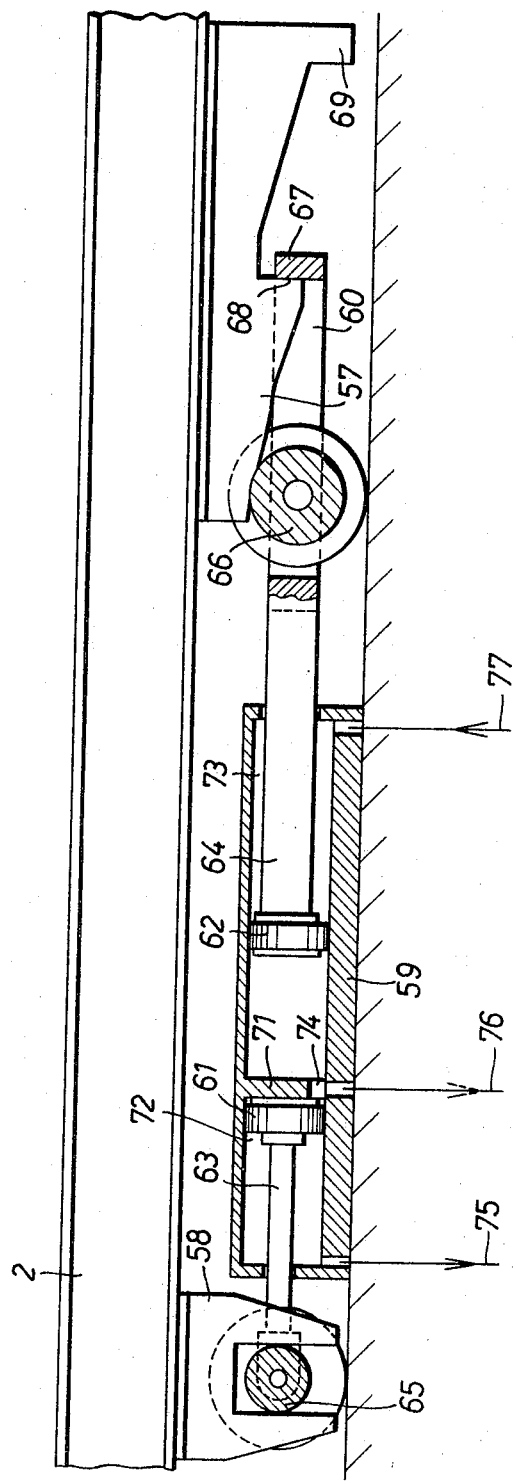
FIG. 11 shows the position which the parts of FIGS. 8–10 take at the end of the lowering of the feed beam.
Figure 12:
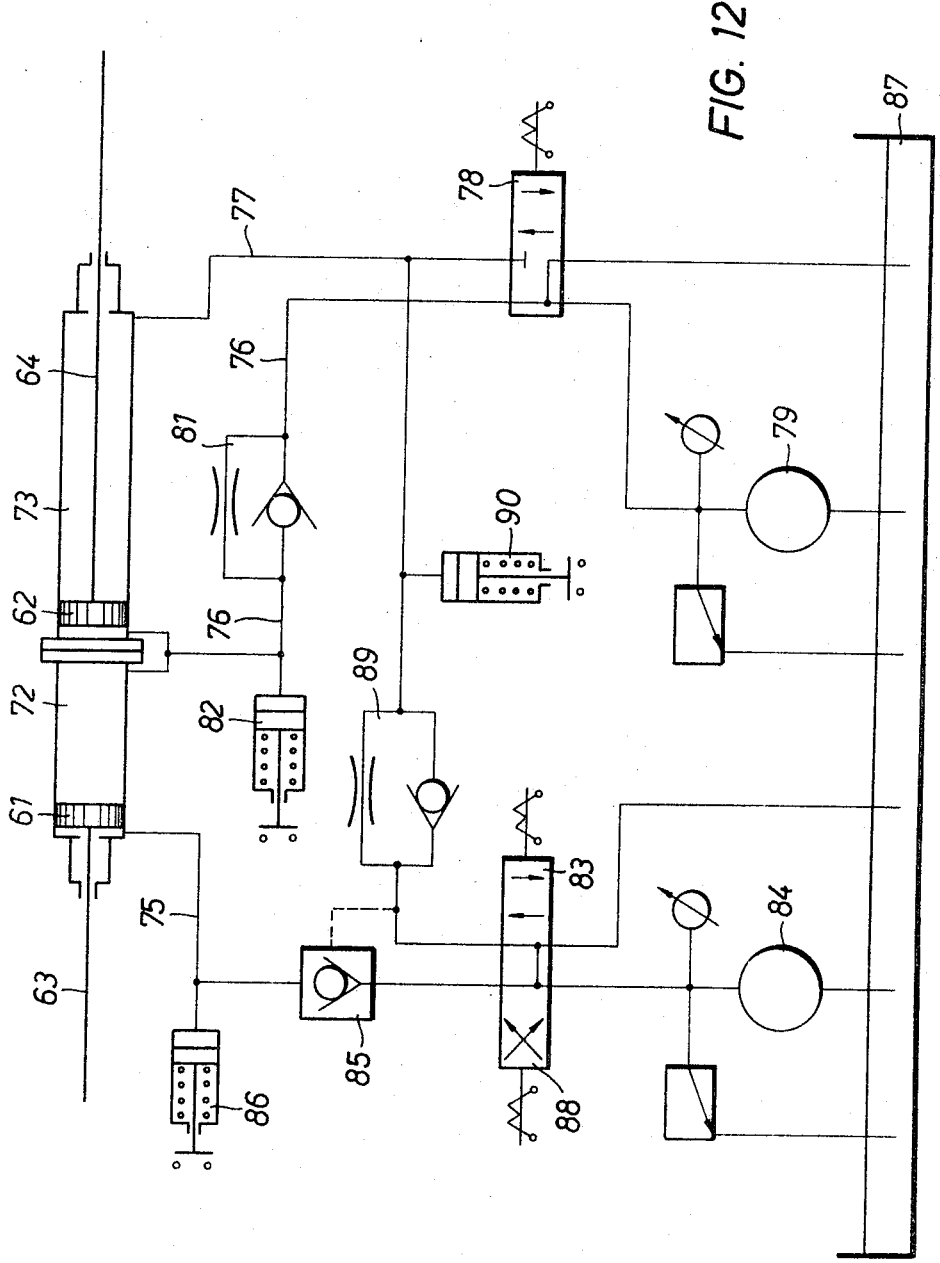
FIG. 12 shows the hydraulic circuit for the structure of FIGS. 8–11.

The above-described cycle of operations is controlled in such a way that at the beginning of the operating cycle shown in FIG. 8 there is through a time delay or through a hand switch provided an electrical impulse which is delivered to a control valve 78 shown in FIG. 12. This will bring about a supply of oil via the pump 79 through a throttling check valve 81 situated in the conduit 76 so that the fluid under pressure is delivered to the piston sides of the cylinder chambers 72 and 73. As a result, the piston 62 moves to the right until the lock 67 engages the stop 61, and then as a result of the increasing pressure through the conduit 76 a switch 82 which is sensitive to pressure is actuated to return the pump 79 to its idling operation where it does not deliver any fluid under pressure, and at the same time a control valve 83 is actuated. Through actuation of the control valve 83 oil supplied by the pump 84 is delivered through the conduit 75 and the check valve 85 to the piston-rod side of the cylinder chamber 72. As a result of the zero feeding pressure of the pump 79 and the situation of the lock 67 against the stop 69, the pistons 61 and 62 move while maintaining the spacing therebetween without any change, the entire assembly now moving to the right until the end of the feeding stroke which is illustrated in FIG. 10. At the end of the feeding stroke the pressure in the conduit 75 increases and acts through the pressure-responsive switch 86 to terminate the actuation of the control valves 78 and 83 so that the pump 79 simply moves the oil freely to and from the reservoir 87.

As a result of the switch 86 there is simultaneously the actuation of the control valve 88 in the conduit 75. The weight of the beam 2 acts through the wedge 57, the roller 66, the piston rod 64 and the piston 62 so that the oil under pressure in the cylinder chamber 73 at the piston side thereof flows through the conduit 76 and the throttling non-return valve 81. As a result, the piston 62 moves to the left and brings about downward movement of the beam 2 while the piston 61 remains in the end position illustrated in FIG. 12 since the oil discharged at the piston side of the chamber 72 is blocked by the non-return valve 85 in the conduit 75.

As soon as the beam 2 has lowered fully to its bottom elevation (FIG. 11), the lock 67 again engages the stop 68 so that the pressure in the conduit 76 or at the piston side of the cylinder chamber 72 drops to zero and the non-return valve 85 opens as a result of the pressure which is derived from the pump 84. As a result, both of the pistons 61 and 62 return to their starting positions shown in FIG. 8. As soon as the starting positions are reached, the pressure in the conduit 77 again rises so that the switch 90 is again actuated, the control valve 88 closes and thus the operating cycle ends.

With the arrangement of the invention, the operating cycle can be interrupted at any time. Such an interruption or turning off of the operation can be brought about when the valves 78 and 83 are open, not via an increase of pressure in the conduit 75 or through the switch 86, but rather in a preliminary manner through a signal such as, for example, a light barrier. This signal closes the control valve 83 and actuates a time delay relay which is not illustrated so that the follow-up movement of the beam 2 is braked via the throttling check valve 89. The time delay relay then closes the control valve 78 and opens the control valve 88 so that the beam 2 again moves down. The feed piston 61, however, dwells in its position and is prevented from moving to the left as long as the supply pressure of the pump 84 is not capable of opening the non-return valve 85.

Figure 13:
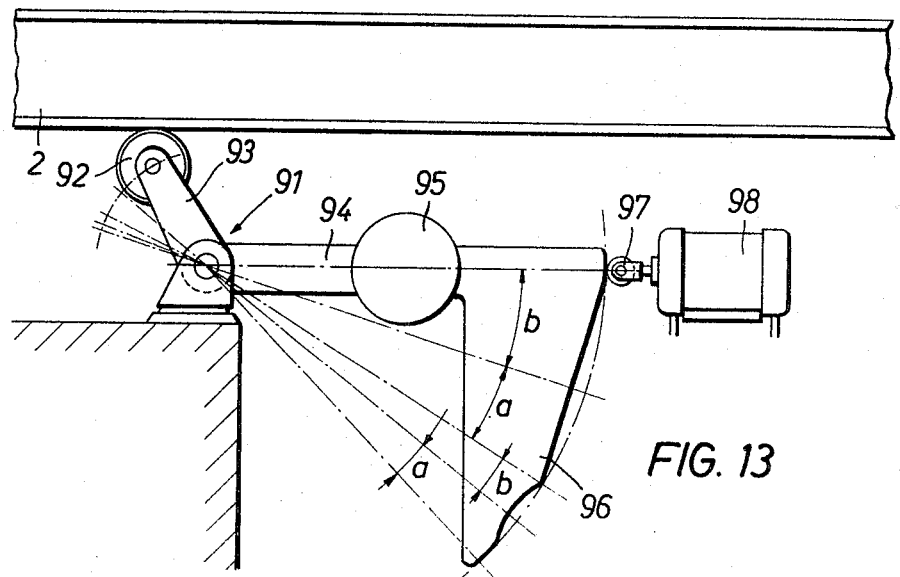
FIG. 13 shows the control structure for the oil flow of the hydraulic circuit, with the beam of FIG. 13 shown in its elevated position.

Instead of controlling the movement of the beam in a downward direction by way of a camming surface of the configuration for the cam 57, it is possible in accordance with the invention to bring about a similar result by controlling the flow. For this purpose, there is provided, as illustrated in FIG. 13, beneath the beam 2 a bell crank lever 91 supported for free turning movement about a horizontal transversely extending pivot and having a roller 92 carried by the free end of the upwardly directed arm 93, this roller 92 directly engaging the lower surface of the beam 2. The other arm 94 is provided with a counterweight 95 which maintains the roller 92 constantly in engagement with the beam 2. At its free end the arm 94 is in addition provided with a cam 96 having a camming surface engaged by a roller 97 of a control switch 98 which controls the pressure of the oil which acts on the piston 62. The camming surface of the cam 96 has a configuration which will provide in the regions *a* (during lifting or raising of the work upwardly beyond the stationary beams) a retarding in the movement and in the regions *b* an acceleration of the movement of the beam.

Figure 14:
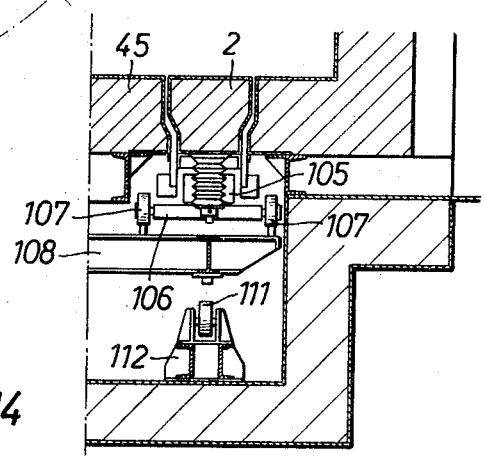
FIG. 14 illustrates an arrangement where the beams at the hearth or floor of the furnace are supported by springs.
Figure 15:
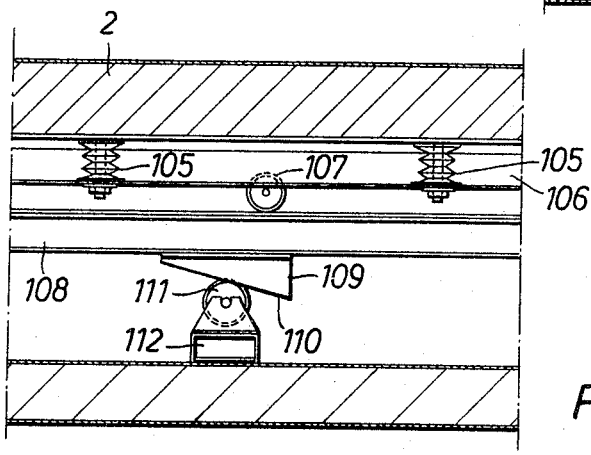
FIG. 15 is a fragmentary longitudinal schematic elevation of the arrangement of FIG. 14.

With the arrangement illustrated in FIGS. 14 and 15, the beams 2 are situated in their rest positions in a plane flush with the stationary hearth 45 of the furnace and in accordance with the invention are supported through springs 105 on the lifting carriages 106. These carriages 106 have rollers 107 which roll along rails of a frame 108. The frames 108 have on their underside the lifting cams 109, having camming edges 110 engaged by rollers 111 which are supported for rotation about stationary axes by way of the supporting units 112. During the horizontal movement of the lifting frame 108, each of the beams 2 will be raised by way of rolling of the cam 109 along the roller 111 which coacts therewith. During movement upwardly through the hearth plane under load the work is very smoothly and gently raised by way of the springy mounting of the beams 2 through the springs 105, and the same gentle treatment is achieved during lowering of the work back onto the hearth 45 at the end of a feeding stroke. During the next following upward movement a springy and thus impact-free operation is again achieved. In this way, without any large cost for complex structures, damaging of the hearth of the furnace and of the operating mechanisms are avoided, and it is to be noted that such damage can easily and does indeed frequently occur with known feeding beams of furnaces where there are no springy supports or controls for the lifting movements.

Figure 16:
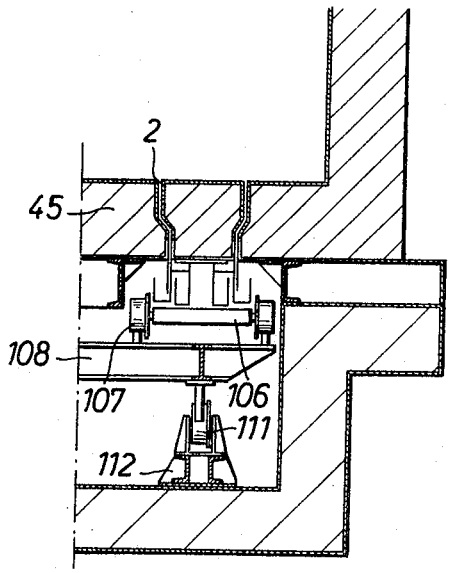
FIG. 16 is a fragmentary transverse partly sectional schematic elevation of another embodiment which includes a spring in a transmission to the movable set of beams.
Figure 17:
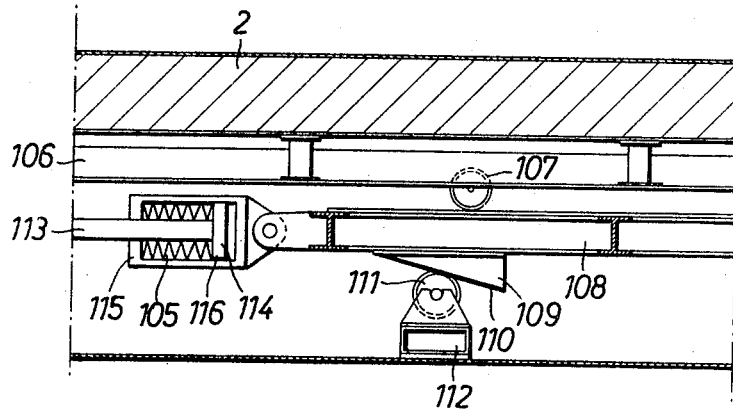
FIG. 17 is a fragmentary longitudinal schematic partly sectional elevation of the arrangement of FIG. 16.

With the arrangement shown in FIGS. 16 and 17 the piston rods 113 of unillustrated lifting cylinders are operatively connected with the lifting frame 108. Each piston rod 113 is surrounded at an end region by a spring assembly 105, preferably a packet of cup springs or a compressed coil spring, the ends of the spring structure engaging, on the one hand, the flange 114 which is fixed to the end of the rod 113 and, on the other hand, the inwardly directed flange 115 of a spring housing 116 which surrounds the spring 115 and which is pivotally connected to the frame 108.

During horizontal movement of the piston rod 113 the frame 108 and the beam 2 therewith will, depending upon the direction of movement, be either raised or lowered by way of the coaction between the wedge 109 and the roller 111. When moving through the hearth plane under load the work which is to be heated is set down very gently on the hearth 45 as a result of the springy transmission through the piston rod 113 and the frame 108, while during the next following lifting stroke there is also a springy and impact-free operation. In this way the embodiment of FIGS. 16 and 17 will achieve, in the same way as the embodiment of FIGS. 14 and 15, an avoidance of any injury to the furnace hearth or to the lifting mechanism without resorting to complex expensive mechanisms. It is to be noted that the spring assemblies, which are protected by the housings in which they are located, are easily accessible between the ends of the piston rods and the frames 108 and can thus be very conveniently exchanged, repaired or adjusted so as to have a preselected spring characteristic which adapts the springs for the best possible operations for a given job.

In the foregoing, the invention has been described in connection with several preferred arrangements thereof. Since many other variations and modifications will now become obvious to those skilled in the art, it is desired that the breadth of the claims not be limited to the specific disclosure therein contained.

What is claimed is:

1. An elongated heat tunnel through which work is to be fed in a feeding direction by means of at least two sets of beams operatively mounted in said heat tunnel so as to move in said feed direction and downwardly and rearwardly with respect to said feed direction, said beams having surfaces adapted to alternately contact the work, the adjacent beams of said two sets of beams defining slits therebetween, said beams further having varying U-shaped cross-sections, transversely with respect to said feed direction, the areas of said U-shaped cross-sections decreasing in the feed direction, and means operatively mounted in said heat tunnel for insulating the work against radiation heat losses.

2. The combination of claim 1 including at least one operating means operatively connected with at least one of said sets of beams for cyclically moving the latter through cycles during which the contacting surfaces thereof move sequentially upwardly and forwardly with respect to the contacting surfaces of the beams of the other set, and wherein said operating means includes a pair of drives one of which raises and lowers the beams of said one set and the other of which moves the beams of said one set forwardly and rearwardly of the tunnel, said other drive moving the beams of said one set rearwardly while said one drive moves the beams of said one set first down below the contacting surfaces of the beams of said other set and then back up to the elevation of the contacting surfaces of the beams of said other set, and all of said beams of said both sets having with respect to each other upper surface portions which are laterally offset transversely to the longitudinal direction of feed through the tunnel with the offset portions of the beams of said one set and the offset portions of the beams of said other set being spaced from each other by a distance greater than the extent of forward and rearward feed of the beams of said one set, so that the offset portions of the beams of both sets do not interfere with each other and so that the lower surfaces of the work are engaged at different areas during progress of the work through the tunnel.

3. The combination of claim 2 and wherein the drive of said operating means for forward and rearward movement of said one set of beams does not commence the rearward movement of said one set of beams until the drive for lowering and raising said one set of beams has started to lower said one set of beams, and the latter drive starting the raising of said one set of beams before the other drive reverses the movement of said one set of beams from a rearward direction of movement to a forward direction of movement.

4. The combination of claim 3 and wherein a second operating means identical with said one operating means is operatively connected with said other set of beams for operating the latter in a manner identical with the operation of said one set of beams but out of phase therewith so that the work is in substantially continuous movement through the tunnel, and both of said operating means being coupled together for raising the contacting surfaces of the beams of one set to a predetermined feed elevation before the contacting surfaces of the beams of the other set are lowered below said predetermined feed elevation.

5. An elongated heat tunnel according to claim 1, wherein the cross-sections of said beams in the feed direction have rectangularly shaped recesses of such size and shape that the beams of said two sets of beams are positioned along side each other at a distance less than the full width of the maximum transverse U-shaped cross-section of said beams, without interference in their feed direction movement.

6. An elongated heat tunnel according to claim 1, wherein said insulating means include longitudinal members mounted on said two sets of beams opposite said slits, said longitudinal members being semi-circular in cross-section.

7. An elongated heat tunnel according to claim 6, wherein said longitudinal members are mounted underneath at least one of said two sets of beams.

8. An elongated heat tunnel according to claim 6, wherein said longitudinal members are mounted above at least one of said two sets of beams.

9. An elongated heat tunnel according to claim 6, wherein said longitudinal members are heated to a temperature approximating the temperature in said heat tunnel.

10. An elongated heat tunnel according to claim 6, wherein said longitudinal members have a cross-sectional shape selected from the group of circular, semi-circular, trapezoidal, and rectangular shapes.

References Cited

UNITED STATES PATENTS

| 2,056,070 | 9/1936 | Menough | 263—6 A |
| 3,450,394 | 6/1969 | Wilde et al. | 263—6 A |

FOREIGN PATENTS

| 1,325,350 | 3/1963 | France | 263—6 A |
| 1,542,339 | 9/1968 | France | 263—6 A |

CHARLES J. MYHRE, Primary Examiner